United States Patent
Chen et al.

(10) Patent No.: US 10,440,406 B2
(45) Date of Patent: Oct. 8, 2019

(54) METHOD AND APPARATUS FOR TRANSMITTING OR RECEIVING MULTIMEDIA

(71) Applicant: Samsung Electronics Co., Ltd., Gyeonggi-do (KR)

(72) Inventors: Chuantao Chen, Beijing (CN); Jianwei Xu, Beijing (CN); Zhichun Shen, Beijing (CN)

(73) Assignee: Samsung Electronics Co., Ltd (KR)

( * ) Notice: Subject to any disclaimer, the term of this patent is extended or adjusted under 35 U.S.C. 154(b) by 177 days.

(21) Appl. No.: 15/511,984

(22) PCT Filed: Aug. 7, 2015

(86) PCT No.: PCT/KR2015/008308
§ 371 (c)(1),
(2) Date: Mar. 16, 2017

(87) PCT Pub. No.: WO2016/043432
PCT Pub. Date: Mar. 24, 2016

(65) Prior Publication Data
US 2018/0234712 A1    Aug. 16, 2018

(30) Foreign Application Priority Data
Sep. 17, 2014  (CN) .......................... 2014 1 0474915

(51) Int. Cl.
*H04N 21/234* (2011.01)
*H04N 21/236* (2011.01)
(Continued)

(52) U.S. Cl.
CPC ....... *H04N 21/23412* (2013.01); *H04L 65/60* (2013.01); *H04N 21/234* (2013.01);
(Continued)

(58) Field of Classification Search
CPC ....... H04N 21/23605; H04N 21/23412; H04N 21/236
See application file for complete search history.

(56) References Cited

U.S. PATENT DOCUMENTS

2012/0321424 A1   12/2012   Bebout
2013/0014193 A1    1/2013   Emura
(Continued)

FOREIGN PATENT DOCUMENTS

CN     103843351      6/2014
KR   1020130040090    4/2013
(Continued)

OTHER PUBLICATIONS

U.S. Appl. No. 62/049,407, filed Sep. 12, 2014. (Year: 2014).*
(Continued)

*Primary Examiner* — Junior O Mendoza
(74) *Attorney, Agent, or Firm* — The Farrell Law Firm, P.C.

(57) ABSTRACT

According to an embodiment, a method of transmitting multimedia comprising assigning media processing unit (MPU) metadata included in a first MPU and a second MPU such that the MPU metadata is transmitted as last of the first MPU and the second MPU; generating the first MPU and the second MPU based on the assignment; generating interval information indicating a transmission time interval for transmitting the first MPU and the second MPU; transmitting the first MPU; transmitting control information within the transmission time interval indicated by the interval information; and transmitting the second MPU based on the interval information, after transmitting the control information is provided.

16 Claims, 13 Drawing Sheets

(51) Int. Cl.
*H04L 29/06* (2006.01)
*H04N 21/2381* (2011.01)
*H04N 21/438* (2011.01)
*H04N 21/6377* (2011.01)

(52) U.S. Cl.
CPC ....... *H04N 21/236* (2013.01); *H04N 21/2381* (2013.01); *H04N 21/4384* (2013.01); *H04N 21/6377* (2013.01)

(56) References Cited

U.S. PATENT DOCUMENTS

| | | | |
|---|---|---|---|
| 2013/0086213 A1 | 4/2013 | Rhyu et al. | |
| 2013/0094518 A1* | 4/2013 | Bae | H04L 65/607 370/474 |
| 2013/0094594 A1* | 4/2013 | Bae | H04N 21/236 375/240.26 |
| 2015/0020138 A1 | 1/2015 | Bae | |
| 2015/0146798 A1 | 5/2015 | Lee et al. | |
| 2017/0012765 A1* | 1/2017 | Kitazato | H04L 65/4076 |
| 2017/0180766 A1* | 6/2017 | Iguchi | H04L 65/602 |

FOREIGN PATENT DOCUMENTS

| | | |
|---|---|---|
| KR | 1020130040144 | 4/2013 |
| KR | 1020130040147 | 4/2013 |
| KR | 1020130040148 | 4/2013 |
| KR | 1020140009043 | 1/2014 |
| WO | WO 2013/119023 | 8/2013 |

OTHER PUBLICATIONS

Shuichi Aoki et al., "Effective Usage of MMT in Broadcasting Systems", IEEE International Symposium on Broadband Multimedia Systems and Broadcasting (BMSB), Jun. 5, 2013, 6pgs.
"Service Configuration, Media Transport Protocol, and Signalling Information for MMT-based Broadcasting Systems", ITU-T Draft, Study Period 2013-2016, Jul. 9, 2015, 27 pages.
MPEG-H Systems, "Text of ISO/IEC 2nd CD 23008-1 MPEG Media Transport", ISO/IEC JTC1/SC29/1/WG11, Coding of Moving Pictures and Audio, Jan. 2013, 152 Pages.
European Search Report dated Feb. 26, 2018 issued in counterpart application No. 15842462.2-1209, 9 pages.
International Search Report dated Nov. 17, 2015 issued in counterpart application No. PCT/KR2015/008308, 19 pages.
Chinese Office Action dated Jun. 26, 2019 issued in counterpart application No. 201410474915.6, 12 pages.

* cited by examiner

METHOD AND APPARATUS FOR TRANSMITTING OR RECEIVING MULTIMEDIA

PRIORITY

This application is a National Phase Entry of PCT International Application No. PCT/KR2015/008308, which was filed on Aug. 7, 2015, and claims priority to Chinese Patent Application No. 201410474915.6, which was filed on Sep. 17, 2014, the contents of each of which are incorporated herein by reference.

TECHNICAL FIELD

The present disclosure relates to the field of multimedia transmission technology, and more particularly, to a Moving Pictures Experts Group (MPEG) Media Transport (MMT) packet transmission and reception method and a device for performing the same.

BACKGROUND ART

In broadcasting multimedia, when a terminal device starts to implement access or changes channels, in order to obtain first data, which may be reproduced, the terminal device must wait for a time period of a head of the data, which may be reproduced or at least one complete reproduction frame. Conventional broadcasting methods utilize Moving Pictures Experts Group 2-Transport Stream (MPEG2-TS) technology and transmit control head information via packets corresponding to different digital television technology standards, such as Program Specific Information (PSI) packets associated with MPEG2-TS technology, Service Information (SI) packets associated with Digital Video Broadcast (DVB) standards, and Program and System Information Protocol (PSIP) packets associated with Advanced Television Systems Committee (ATSC) standards. At present, an increasingly popular Dynamic Adaptive Streaming over Hypertext Transfer Protocol (HTTP) (DASH) technology transmits an MP4 packet head as a separate fragment (a first fragment) for use as a decoding reference for subsequent data.

The above two methods have their limitations. For example, the terminal device is only able to decode and reproduce audio and video data after receiving the control information. That is, when the terminal device starts to implement access or changes channels, the wait time for reproduction of the program (i.e., the amount of time before the terminal device begins reproduction of the program) is determined based on when the terminal device receives the control information. Generally, wait time for the video to be produced is long. When standard definition video is processed with the MPEG2-TS technology, a theoretical value of the wait time is 1.4 seconds (implemented with hardware). When high definition video or ultra-high definition video is processed, the wait time may multiply. With the DASH technology, the current wait time is 4.5 seconds. From the user perspective, the wait time for reproduction is too long. Especially, in the case in which the user is continuously changing channels (i.e., selecting between channels), the user experience is very poor.

DETAILED DESCRIPTION OF THE INVENTION

Technical Problem

When randomly accessing multimedia (e.g., performing a random access operation), wait time for reproducing the multimedia may increase according to when data packets relating to transmitted multimedia are received.

Technical Solution

An embodiment of the present disclosure provides a method of transmitting multimedia comprising assigning media processing unit (MPU) metadata included in a first MPU and a second MPU such that the MPU metadata is transmitted as last of the first MPU and the second MPU; generating the first MPU and the second MPU based on the assignment; generating interval information indicating a transmission time interval for transmitting the first MPU and the second MPU; transmitting the first MPU; transmitting control information within the transmission time interval indicated by the interval information; and transmitting the second MPU based on the interval information, after transmitting the control information.

Advantageous Effects of the Invention

One or more embodiments of the present disclosure include storing a signaling message in a server and transmitting only index information corresponding to the signaling message, instead of directly transmitting the signaling message, and receiving the signaling message from the server at a reception side, thereby efficiently managing the bandwidth of a broadcast channel and saving time. Also, a time interval between changing channels and receiving data with respect to transmitted multimedia may be reduced.

DETAILED DESCRIPTION

Figure 1:
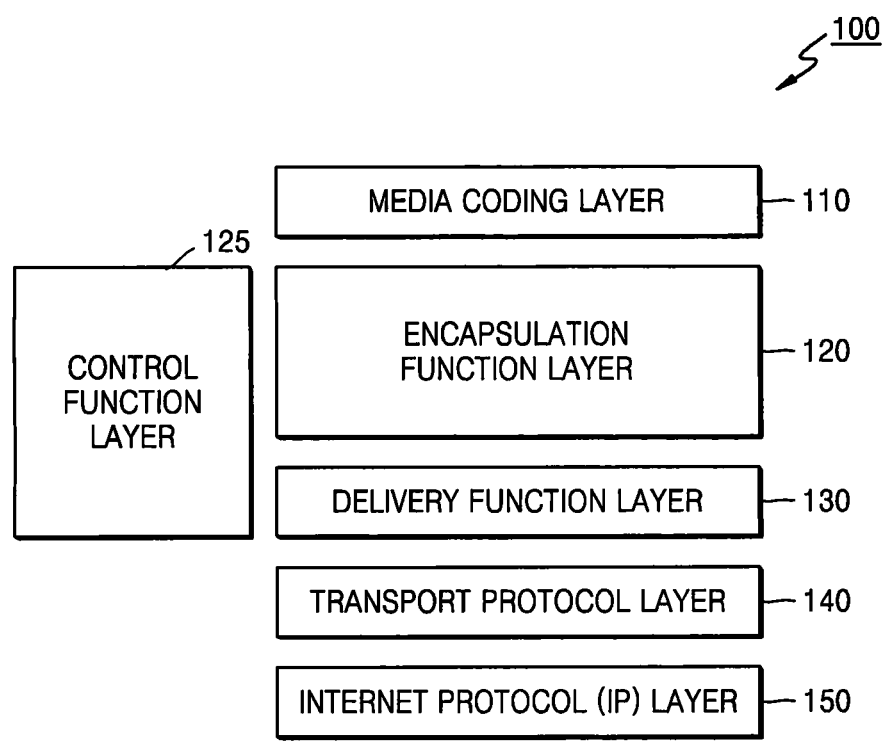
FIG. 1 is a block diagram of a layer structure 100 of a Moving Pictures Experts Group (MPEG) Media Transport (MMT) packet configuring multimedia according to an embodiment.

An embodiment of the present disclosure provides a method of transmitting multimedia comprising assigning media processing unit (MPU) metadata included in a first MPU and a second MPU such that the MPU metadata is transmitted as last of the first MPU and the second MPU; generating the first MPU and the second MPU based on the assignment; generating interval information indicating a transmission time interval for transmitting the first MPU and the second MPU; transmitting the first MPU; transmitting control information within the transmission time interval indicated by the interval information; and transmitting the second MPU based on the interval information, after transmitting the control information.

An embodiment of the present disclosure, the transmitting of the control information comprises: comparing a length of a signaling message as the control information and a preset threshold; when the length of the signaling message is less than the threshold, transmitting the signaling message N times between receipt of the first MPU and the second MPU; and when the length of the signaling message is greater than or equal to the threshold, transmitting index information M times between the receipt of the first MPU and the second MPU, the transmitting index information corresponding to the signaling message, wherein N is a value greater than M, and wherein the index information is used to obtain the signaling message, and the signaling message corresponds to the index information.

An embodiment of the present disclosure, the transmitting of the index information comprises: storing the signaling message in a server; and storing correspondence relationship information in the server, the correspondence relationship information indicating a relationship between the signaling message and the index information.

An embodiment of the present disclosure, the assigning comprises: assigning a transmission order to at least one media fragment unit (MFU) included in at least one of the first MPU and the second MPU and to fragment metadata relating to the at least one MFU; and transmitting the at least one MFU and the fragment data according to the transmission order such that the fragment metadata is transmitted after the at least one MFU is transmitted.

An embodiment of the present disclosure, the assigning comprises: assigning a transmission order to at least one MFU included in at least one of the first MPU and the second MPU and to fragment metadata relating to the at least one MFU; and transmitting the at least one MFU and the fragment data according to the transmission order such that the fragment metadata is transmitted before the at least one MFU is transmitted.

An embodiment of the present disclosure provides a device for transmitting multimedia comprising: a transmitter configured to transmit at least one of a first MPU, a second MPU, and control information; and a controller configured to control the transmitter to assign MPU metadata included in the first MPU and the second MPU such that the MPU metadata is transmitted as last of the first MPU and the second MPU, generate the first MPU and the second MPU based on the assignment, generate interval information indicating a transmission time interval for transmitting the first MPU and the second MPU, transmit the first MPU, transmit control information within the transmission time interval indicated by the interval information after transmitting the first MPU, and transmit the second MPU based on the interval information after transmitting the control information.

An embodiment of the present disclosure, the controller compares a length of a signaling message as the control information and a preset threshold, when the length of the signaling message is less than the threshold, transmits the signaling message between receipt of the first MPU and the second MPU N times; and, when the length of the signaling message is greater than or equal to the threshold, transmits index information corresponding to the signaling message between the receipt of the first MPU and the second MPU M times, wherein N is a value greater than M.

An embodiment of the present disclosure, when the length of the signaling message is greater than or equal to the threshold, the controller stores the signaling message in a server and stores relationship information indicating a relationship between the signaling message and the index information in the server.

An embodiment of the present disclosure, the controller assigns fragment metadata relating to at least one media fragment unit (MFU) included in at least one of the first MPU and the second MPU such that the fragment metadata is transmitted after the at least one MFU is transmitted.

An embodiment of the present disclosure, the controller assigns fragment metadata relating to at least one MFU included in at least one of the first MPU and the second MPU such that the fragment metadata is transmitted before the at least one MFU is transmitted.

An embodiment of the present disclosure provides a method of receiving multimedia comprising: sequentially receiving a first MPU, control information, and a second MPU that are transmitted according to interval information determined by a transmission device; and reproducing multimedia corresponding to at least one of the first MPU and the second MPU, wherein MPU metadata included in at least one of the first MPU and the second MPU is assigned such that the MPU metadata is transmitted as the at least one of the first MPU and the second MPU.

An embodiment of the present disclosure, the control information includes a length of the signaling message; and the receiving of the control information comprises: receiving a signaling message N times between the receiving of the first MPU and the second MPU when the length of the signaling message is less than a threshold; and receiving index information M times between the receiving of the first MPU and the second MPU when the length of the signaling message is greater than or equal to the threshold, the index information corresponding to the signaling message, wherein N is a value greater than M, and wherein the index information is used to obtain the signaling message, and the signaling message corresponds to the index information.

An embodiment of the present disclosure, the receiving of the index information comprises: receiving the signaling message corresponding to the index information from a server that stores the signaling message.

An embodiment of the present disclosure, the receiving of the signaling message corresponding to the index information comprises: receiving the signaling message corresponding to the index information from the server based on correspondence relationship information indicating a relationship between the signaling message and the index information.

An embodiment of the present disclosure, the receiving comprises: receiving at least one MFU included in at least one of the first MPU and the second MPU; and receiving fragment metadata relating to the at least one MFU after receiving the at least one MFU.

An embodiment of the present disclosure, the receiving comprises: receiving fragment metadata relating to the at least one MFU included in at least one of the first MPU and the second MPU; and receiving the at least one MFU after receiving the fragment metadata.

An embodiment of the present disclosure provides a device for receiving multimedia comprising: a communicator configured to sequentially receive a first MPU, control information, and a second MPU that are transmitted according to interval information determined by a transmission device; and a controller configured to control the communicator to sequentially receive the first MPU, the control information, and the second MPU and reproduce multimedia corresponding to at least one of the first MPU and the second MPU, wherein MPU metadata included in at least one of the first MPU and the second MPU is assigned such that the MPU metadata is transmitted as last of the first MPU and the second MPU.

An embodiment of the present disclosure, the control information includes a length of the signaling message; and the communicator receives a signaling message N times between the receiving of the first MPU and the second MPU when the length of the signaling message is less than a threshold, and receives index information M times between the receiving of the first MPU and the second MPU when the length of the signaling message is greater than or equal to the threshold, the index information corresponding to the signaling message.

An embodiment of the present disclosure, when the length of the signaling message is greater than or equal to the threshold, the communicator receives the signaling message corresponding to the index information from a server that stores the signaling message.

An embodiment of the present disclosure, the communicator receives the signaling message corresponding to the index information from the server based on correspondence relationship information indicating a relationship between the signaling message and the index information.

An embodiment of the present disclosure, the communicator receives at least one MFU included in at least one of the first MPU and the second MPU and receives fragment metadata relating to the at least one MFU after receiving the at least one MFU.

An embodiment of the present disclosure, the communicator receives the at least one MFU after receiving fragment metadata relating to the at least one MFU included in at least one of the first MPU and the second MPU.

Advantages and features of one or more embodiments of the present invention and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

An expression used in the singular encompasses the expression of the plural, unless it has a clearly different meaning in the context.

When a part "includes" or "comprises" an element, unless there is a particular description contrary thereto, the part can further include other elements, not excluding the other elements. Also, the term "unit" in the embodiments of the present invention means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Reference will now be made in detail to embodiments, examples of which are illustrated in the accompanying drawings so that one of ordinary skill in the art may implement the one or more embodiments easily. In the following description, well-known functions or constructions are not described in detail so as not to obscure the embodiments with unnecessary detail.

Moving Pictures Experts Group (MPEG) Media Transport (MMT) packet transmission and reception methods based on a MPEG media transmission technology may be used as methods of transmitting and receiving multimedia according to embodiments. However, these are merely examples for convenience of description and thus, it should be interpreted that embodiments of the present disclosure presented below may be applicable to technologies other than an MMT transmission technology.

FIG. 1 is a block diagram of a layer structure 100 of an MMT packet configuring multimedia according to an embodiment.

Referring to FIG. 1, a media coding layer 110, an encapsulation function layer (Layer E) 120, a delivery function layer (Layer D) 130, a transport protocol layer 140, an Internet protocol (IP) layer 150, and a control function layer (Layer C) 125 for configuring and transmitting a multimedia data packet are illustrated.

According to the embodiment illustrated in FIG. 1, multimedia content and/or multimedia data associated with a multimedia service may be generated in the media coding layer 110 and the encapsulation function layer 120. Also, a multimedia data packet may be configured in the delivery function layer 130 based on the multimedia data input from the encapsulation function layer 120. The multimedia data packet configured in the delivery function layer 130 may be a combination of header information and at least one piece of multimedia data corresponding to or identified by the header information that are provided from the encapsulation function layer 120.

Multimedia data compressed in the media coding layer 110 may be packaged and output in a format similar to a file format through the encapsulation function layer 120. In the encapsulation function layer 120, a data segment and access units for an MMT service that uses the data segment may be generated. The data segment is a small unit for the MMT service and may be generated by inputting encoded media data or stored media data provided from the media coding layer 110. Also, in the encapsulation function layer 120, the access units may be combined and/or separated, and thus a packet format for generating, storing, and transmitting complex content may be generated.

In the delivery function layer 130, after a data unit input from the encapsulation function layer 120 is converted into an MMT payload, an MMT transmission packet inclusive of an MMT transport packet header may be generated or a Real-time Protocol (RTP) packet may be generated by using an RTP transport protocol. The MMT payload may be used to packetize at least one of an MPU, a general object (including perfect MPUs), and a signaling message.

Packets generated in the delivery function layer 130 may be finally IP packetized and transmitted through the transport protocol layer 140, such as a User Datagram Protocol (UDP) or a Transport Control Protocol (TCP).

In the control function layer 125, control information or signaling information necessary for transmission of data according to an embodiment may be generated and added to the data and then transmitted.

An MMT payload format generated in the delivery function layer 130 may be defined as a logical structure of a media unit that is to be transferred by an MMT protocol or the RTP. The MMT payload may be specified by an encapsulated data unit and a payload format for transferring other information through an MMT layer protocol or another application transport protocol. The MMT payload may provide information about streaming and information about a file transfer. In the streaming, a data unit may be an MMT Media Fragment Unit (MFU) or an MMT Media Processing Unit (MPU). A payload of the MMT packet may include a payload header region including composition information and a data region including multimedia data.

An MFU may mean a pure multimedia data portion of an MPU excluding a metadata portion and may be separate from an MMT hint track included in the MPU. That is, multimedia to be reproduced may be encapsulated in the MFU.

A data unit for the file transfer may be an MMT asset and an MMT package. The MMT asset may include an MMT asset identifier and at least one MPU and may mean a data individual including same delivery characteristics data. MMT asset delivery characteristics (ADC) may include information relating to a quality of service (QoS) request for transmitting the MMT asset. MMT composition information (CI) may include information about spatial and temporal relationships between MMT assets. The MMT package may include at least one piece of CI, at least one MMT asset, and an ADC relating to each asset.

Figure 2A:
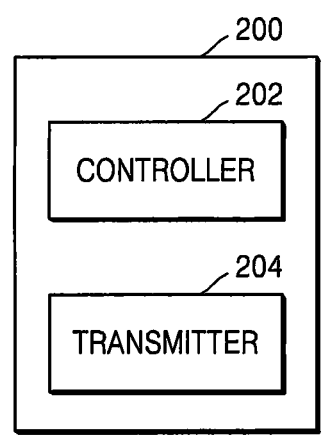
FIG. 2A is a block diagram of a multimedia transmission device for transmitting multimedia.

FIG. 2A is a block diagram of a multimedia transmission device 200 for transmitting multimedia. According to an embodiment, the multimedia transmission device 200 may include a controller 202 and a transmitter 204.

The controller 202 according to an embodiment may determine interval information indicating a time interval by which MPUs are to be transmitted, may transmit control information between transmissions of the MPUs, and may assign MPU metadata at the end of each MPU. According to an embodiment, when a multimedia reception device 202 performs a random access operation for reproducing transmitted multimedia, the multimedia reception device 202 may receive the control information to perform an operation of accessing a channel or changing channels. The control information may include a signaling message delivered as information necessary for data transmission and random information received to perform and may further include random information received to perform channel access and channel change operations in a multimedia reception device 220. According to an embodiment, an MMT payload corresponding to a signaling message may include payload type information indicating that a data region includes the signaling message in a header region. The controller 202 may transmit the signaling message between transmissions of MPUs according to the determined interval information and insert MPU metadata and fragment metadata into the MPUs so that packets may be assigned in the MPUs. The communicator 204 may communicate with various types of external devices according to various types of communication schemes. For example, the communicator 204 may include at least one of a WiFi chip and a wireless communication chip. When the communicator 204 uses the WiFi chip, the communicator 204 may communicate through a WiFi scheme, transmit and receive various types of connection information such as an SSID, a session key, etc., and transmit and receive various types of information after establishing communication by using the connection information. When the communicator 204 uses the wireless communication chip, the wireless communication chip may be a chip performing communication according to various communication specifications such as IEEE, Zigbee, 3G (3rd Generation), 3GPP (3rd Generation Partnership Project), LTE (Long Term Evolution), etc.

Fragment data according to an embodiment may include information about a fragmentation indicator (FI). When basic data including the transmitted multimedia splits into partial data, perfect basic data may be configured by using the FI. The FI may indicate that partial data corresponds to the beginning, middle, or end of the basic data including multimedia. For example, when basic data of an MMT payload is an MPU, the multimedia transmission device 200 may obtain an FI that the multimedia reception device 220 indicates partial data corresponding to the beginning, middle, or end among partial data split from the MPU and may transmit the FI in order to obtain a perfect MPU based on the partial data and the FI. By doing this, when the multimedia reception device 220 receives partial data corresponding to the beginning, middle, or end of the MPU transmitted by the multimedia data device 200 without any loss, a terminal may configure the perfect MPU to perform decoding processing. For example, a payload for non-live streaming transmission such as live streaming or video on demand (VoD) may include an MFU or an MPU that is at least one basic data and may split and transmit basic data into partial data corresponding to a certain range section. In the case of file transmission, a whole file may be regarded as an MPU and transmitted or some of partial files corresponding to a certain range may split from the whole file and transmitted. The multimedia transmission device 200 may use the FI to represent partial data constituting one piece of basic data. The multimedia transmission device 200 may transmit an MMT including the same type of a plurality of MPUs or MFUs and a signaling message, thereby constituting an MFU or MPU unit by using the partial data received by the multimedia reception device 220 and the FI.

Figure 2B:
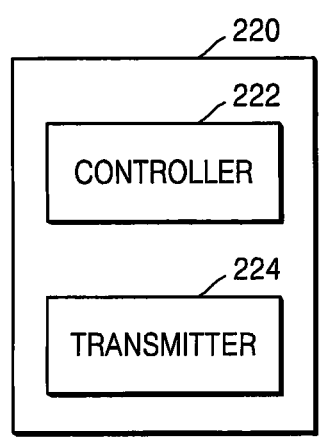
FIG. 2B is a block diagram of a multimedia reception device for receiving multimedia.

FIG. 2B is a block diagram of the multimedia reception device 220 for receiving multimedia. According to an embodiment, the multimedia reception device 220 may include a controller 222 and a communicator 224.

The controller 222 according to an embodiment may reproduce multimedia by using data received through the communicator 224. The communicator 224 may receive MPUs according to interval information indicating a time interval and may receive control information between receipt of the MPUs. The communicator 224 may communicate with various types of external devices according to various types of communication schemes. For example, the communicator 224 may include at least one of a WiFi chip and a wireless communication chip. When the communicator 224 uses the WiFi chip, the communicator 224 may communicate by using a WiFi scheme, transmit and receive various types of connection information such as an SSID, a session key, etc. and may transmit and receive various types of information after establishing communication by using the connection information. The wireless communication chip may be a chip performing communication according to various communication specifications such as IEEE, Zigbee, 3G (3rd Generation), 3GPP (3rd Generation Partnership Project), LTE (Long Term Evolution). When the communicator 224 uses the wireless communication chip, the communicator 224 may communicate by using any of the various communication specifications.

According to an embodiment, the communicator 224 may receive MPU metadata assigned at the end of the MPU and may reproduce the multimedia by using the received MPU metadata. According to an embodiment, when the multimedia reception device 220 performs a random access operation (e.g., randomly accesses a channel) and reproduces multimedia received from the channel, the multimedia reception device 220 may receive control information through the communicator 224 to perform a channel access or change operation, etc. The control information may include a signaling message including information necessary for data transmission in the control function layer 125 and may further include random information for performing the channel access and change operations in the multimedia reception device 220. According to an embodiment, an MMT payload corresponding to the signaling message may include payload type information in a header region. The payload type information may indicate whether indicating a data region includes the signaling message. The controller 222 may control the communicator 224 to receive the signaling message between transmissions of the MPUs according to the determined interval information and may assign the MPU metadata included in the MPUs and fragment metadata Fragment data received by the multimedia reception device 220 according to an embodiment may include information about an FI.

When basic data including the received multimedia is split into partial pieces of data, the controller 222 of the multimedia reception device 220 may rejoin the pieces into perfect basic data by using the FI, thereby reproducing multimedia. The FI may indicate which of the partial pieces of the data correspond to the beginning, middle, or end of the basic data including multimedia. For example, when basic data of an MMT payload is an MPU, the multimedia reception device 220 may obtain an FI indicating partial data corresponding to the beginning, middle, or end among partial data split from the MPU and may obtain a perfect MPU based on the partial data and the FI. By doing this, when the multimedia reception device 220 receives partial data corresponding to the beginning, middle, or end of the MPU without any loss, the controller 222 may configure the perfect MPU to perform decoding processing. For example, a payload for live streaming transmission or non-live streaming transmission such as VoD may include basic data, e.g, an MFU or an MPU, may split the basic data by using the FI, and may receive partial data corresponding to a section of the basic data. In the case of receiving a file, the entire file may be regarded as an MPU, and one or more portions of the file within a specified range may be split from the file and separately received. The multimedia reception device 220 may generate a payload including an MFU or MPU unit by using the received partial data and the FI.

Figure 3A:
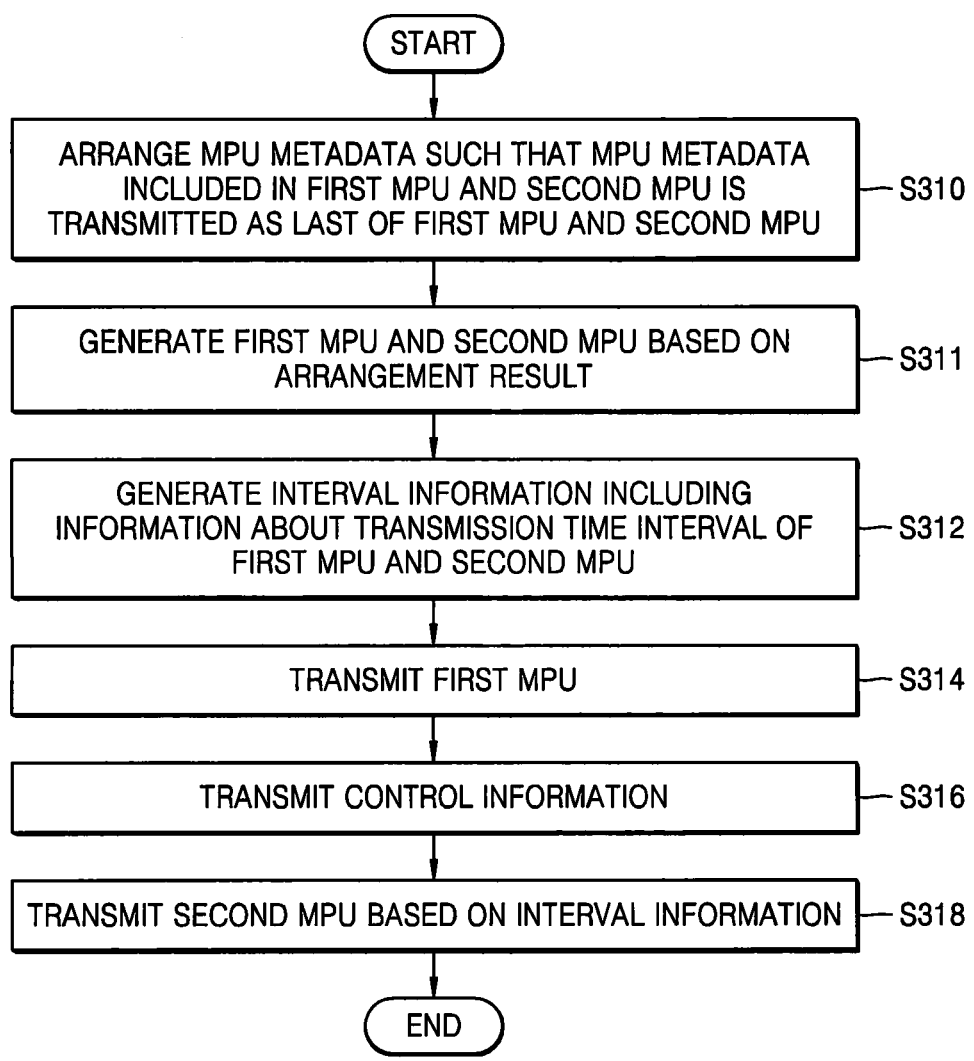
FIG. 3A is a flowchart of a method of transmitting multimedia according to an embodiment.

FIG. 3A is a flowchart of a method of transmitting multimedia according to an embodiment. The method of transmitting multimedia may be performed by the multimedia transmission device 200.

In operation S310, the controller 202 of the multimedia transmission device 200 may determine interval information about a time interval for transmitting an MPU. That is, MPU metadata may be assigned such that MPU metadata included in a first MPU and a second MPU that is to be transmitted is transmitted as last of the first MPU and the second MPU.

According to an embodiment, since multimedia may be reproduced after receiving a signaling message, a wait time taken to reproduce the multimedia may be greatly different according to a time when the multimedia reception device 220 performs an access operation during a process of transmitting MPU packets.

Figure 5:
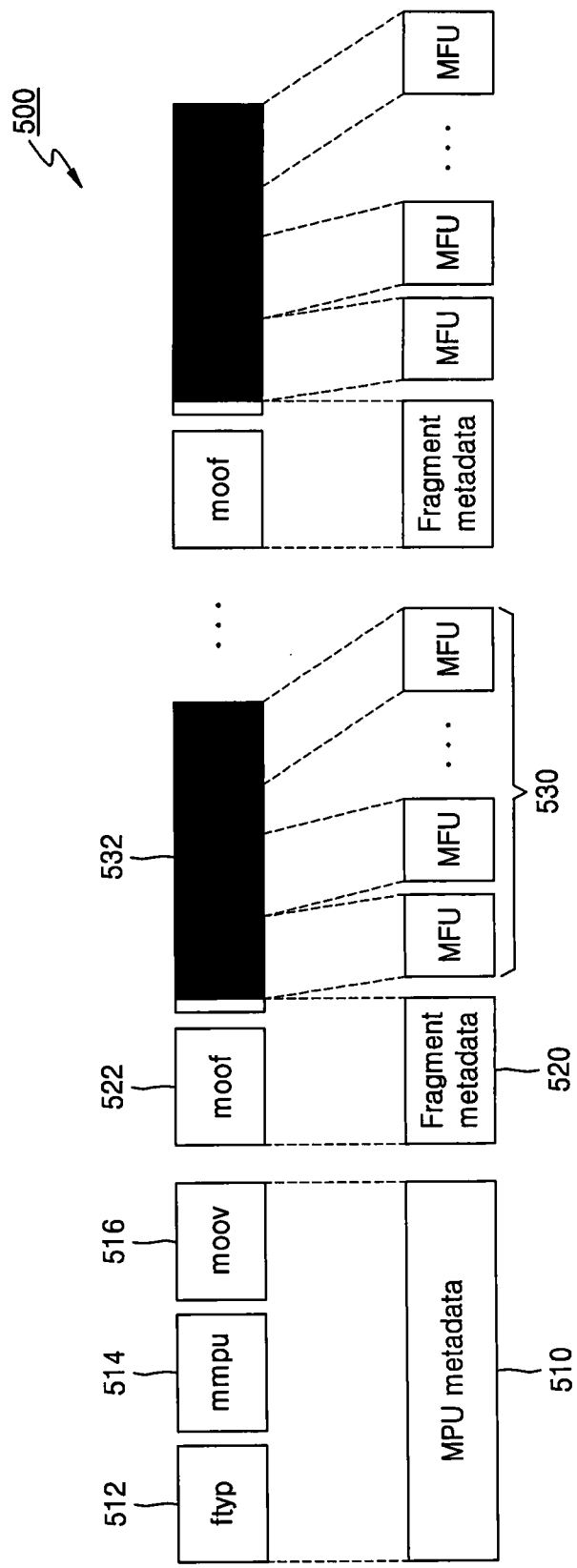
FIG. 5 illustrates elements included in an MPU packet that is data that may be generated in an encapsulation function layer.

FIG. 5 illustrates elements included in an MPU packet 500. MPU packet 500 includes data that may be generated in the encapsulation functional layer 120. Referring to FIG. 5, the MPU packet 500 constituting multimedia may include a plurality of types of data units. The MPU packet 500 generated by the multimedia transmission device 200 may be later transmitted through the deliver function layer 130. Data types included in the MPU packet 500 may include MPU metadata 510 as a first data type, fragment metadata 520 as a second data type, and at least one MPU 530 as a third type.

According to an embodiment, the MPU metadata 510 included in the MPU packet 500 may include ftyp 512 indicating a type of a file corresponding to an MPU, mmpu 514 indicating elements included in the MPU, and moov 516 indicating codec setting information.

According to an embodiment, the fragment metadata 520 of the MPU packet 500 may include moof (movie fragment) 522 that is header information of media data.

According to an embodiment, mdat 514 of the MPU packet 500 may include video samples (VS) (not shown) and MMT hint samples (HS) (not shown). At least one MFU 530 included in the MPU packet 500 may include the MPU metadata 510 including the ftyp 512, the mmpu 514, and the moov 516, along with the HS (not shown) and the VS (not shown) relating to the fragment metadata 520 including moof 516. According to an embodiment, the at least one MFU 530 may include multimedia (for example, data frames such as video resources).

Figure 6:
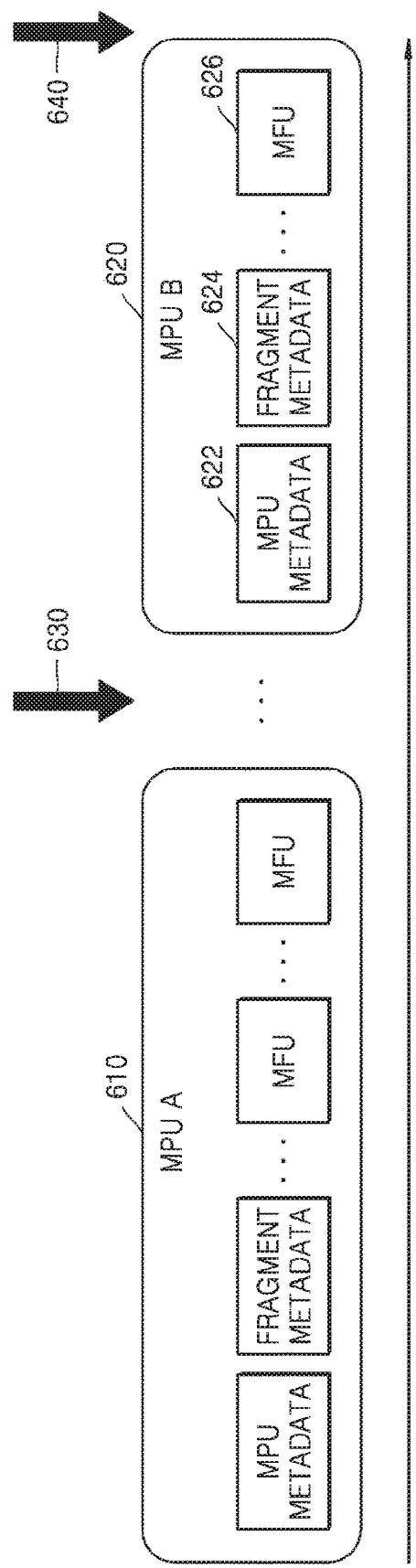
FIG. 6 illustrates a case where a multimedia reception device 220 performs a random access operation between transmissions of two MPUs.

FIG. 6 illustrates a case where the multimedia reception device 220 performs a random access operation between transmissions of two MPUs. When the multimedia transmission device 200 according to an embodiment performs the random access operation during a time interval between transmitting the two MPUs, the multimedia reception device 220 may reproduce multimedia content received after accessing the same, provided that a signaling message is received. When access is performed between the multimedia reception device 220 accesses the two MPUs, the multimedia reception device 220 may be unable to reproduce an MPU A 610 that is previously transmitted before an access time. According to an embodiment, after an access time 630, MPU metadata 622 and fragment metadata 624 corresponding to an MPU B 620 are received. After a time 640 when the MPU B 620 is completely received, multimedia corresponding to the MPU B 620 may be reproduced. That is, a wait time for reproducing the MPU B 620 may be the time period between the access time 630 and the time 640 when the MPU B 620, (that is, an MPU received immediately thereafter) is completely received. Also, according to another embodiment, the wait time for reproducing the MPU B 620 may be the time period between the access time 630 and a time when a signaling message (not shown) transmitted after the MPU B 620 is transmitted is received. The signaling message (not shown) may be a signaling message transmitted according to interval information determined by the multimedia transmission device 200. The interval information may indicate a difference between determined times for transmitting a plurality of MPUs. According to an embodiment, the multimedia corresponding to the MPU B 620 may be multimedia content corresponding to an MFU 626 (not shown) included in the MPU B 620.

Figure 7:
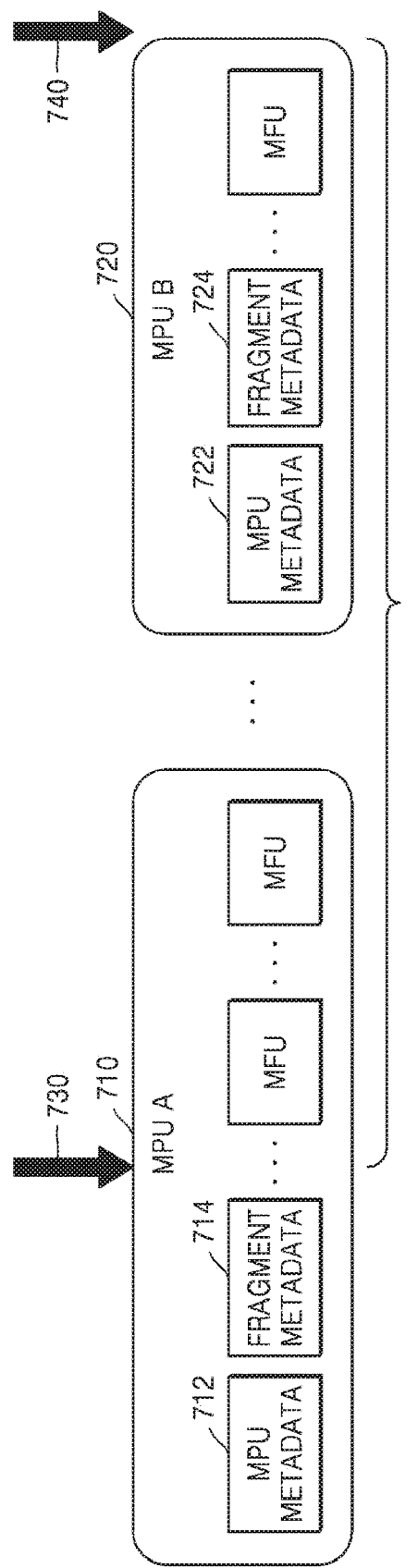
FIG. 7 illustrates a case where a multimedia reception device performs an access operation during an MPU packet transmission process.

FIG. 7 illustrates a case where an access operation is performed during an MPU packet transmission process according to an embodiment. Since MPU metadata 712 corresponding to an MPU A 710 and fragment metadata 714 are not transmitted prior to an access time 730, even after the MPU A 710 is received, multimedia corresponding to the MPU A 710 may not be reproduced. Since MPU metadata 722 corresponding to an MPU B 720 and fragment metadata 724 are received, after a time 740 when the MPU B 720 is completely received, multimedia corresponding to the MPU B 720 may be reproduced. That is, a wait time necessary for performing a reproduction operation may be a time from an access time 730 to the time 740 when the MPU B 720 that is an MPU received immediately thereafter is completely received. Also, according to another embodiment, the wait time for reproducing the MPU B 720 may be a time from the access time 730 to a time when a signaling message (not shown) transmitted after the MPU B 720 is transmitted is received. The signaling message (not shown) may be a signaling message transmitted according to interval information including information about a difference in times when a plurality of MPUs generated by the multimedia transmission device 200 are to be transmitted.

Figure 8:
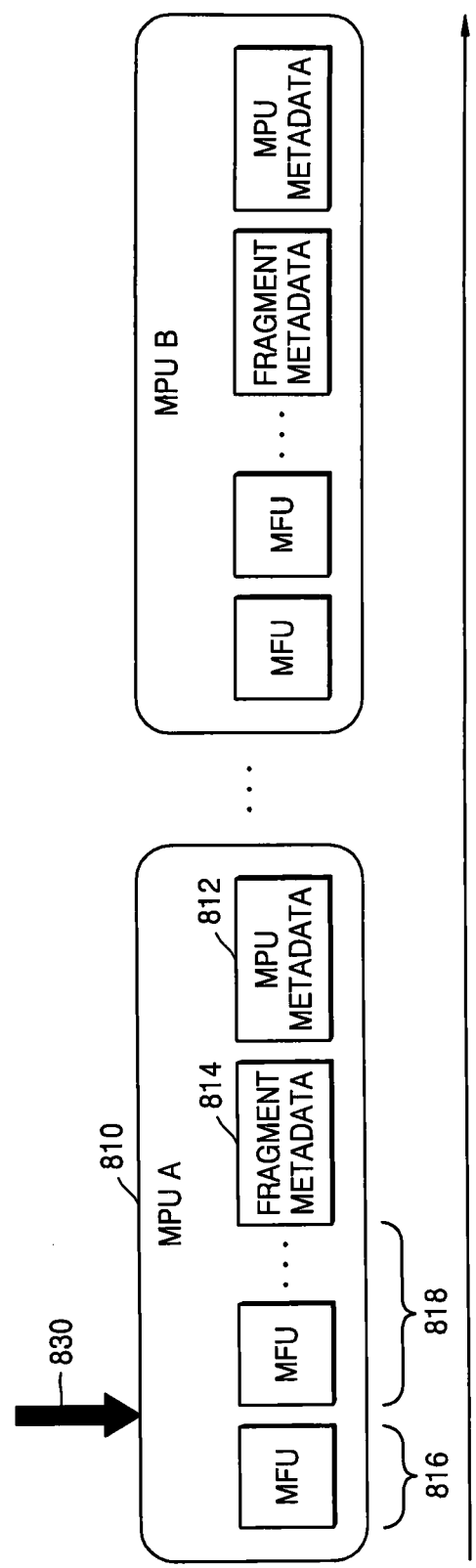
FIG. 8 illustrates a case where a multimedia transmission device transmits MPU metadata and fragment metadata after transmitting a Media Fragment Unit (MFU) according to an embodiment.

FIG. 8 illustrates a case where the multimedia transmission device 200 transmits MPU metadata 812 and fragment metadata 814 after transmitting an MFU according to an embodiment.

According to an embodiment, the controller 202 of the multimedia transmission device 200 may determine a transmission order of an MFU, MPU metadata, and fragment metadata in an MPU such that the MPU metadata and the fragment metadata are transmitted after the MFU is transmitted. Referring to FIG. 8, the MPU metadata 812 and the fragment metadata 814 may be transmitted as data corresponding to last two pieces of data among data included in an MPU A 810. When access is performed during transmission of the MPU A 810, since the MPU metadata 812 and the fragment metadata 814 are received, a multimedia reproduction operation may be promptly performed. In this case, a wait time may be a time from a time 830 when access is performed to a time when the MPU metadata 812 and the fragment metadata 814 of the MPU A 810 are received. Also, according to another embodiment, a wait time may be a time from the time 830 when access is performed to a time when a signaling message (not shown) received after the MPU metadata 812 and the fragment metadata 814 of the MPU A 810 are received is received. The signaling message (not shown) may be a signaling message transmitted according to interval information including information about a difference in times when a plurality of MPUs generated by the multimedia transmission device 200 are to be transmitted.

According to an embodiment, when a random access operation is performed during an MPU transmission process, information about multimedia included in an MPU may be reproduced when fragment metadata and MPU metadata of the MPU, and control information (for example, a signaling message) are transmitted. When the multimedia reception device 220 performs a random access operation during an MPU reception process, receives fragment metadata and MPU metadata of the MPU, but does not receive control information, the received fragment metadata and MPU metadata of the MPU may be discarded.

Figure 9:
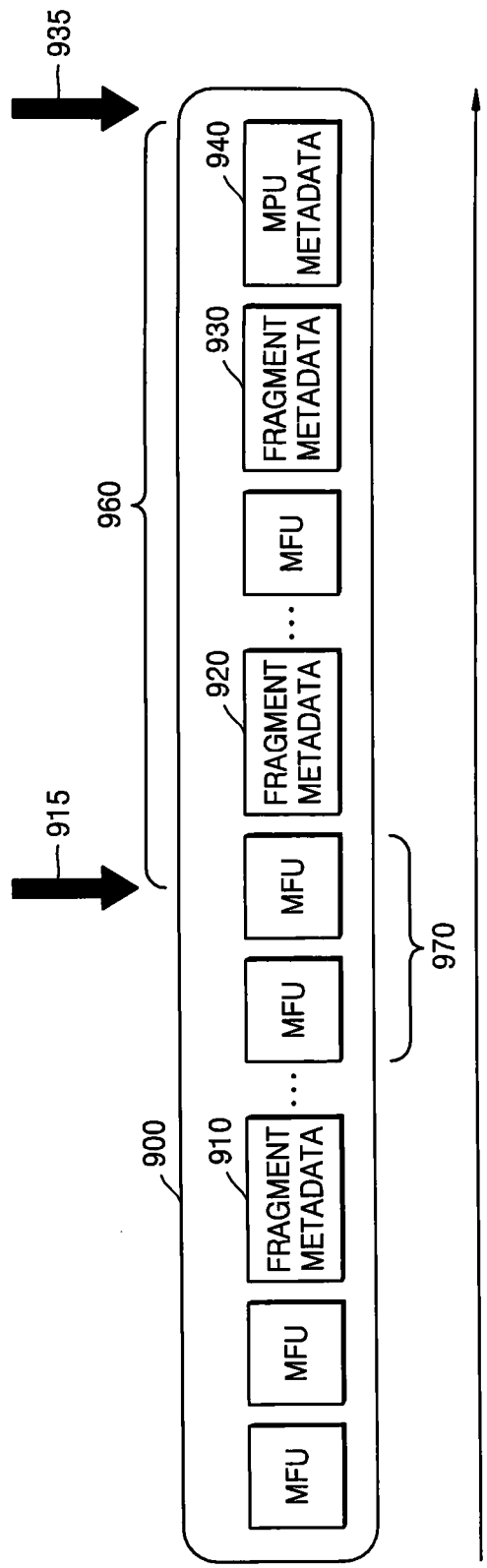
FIG. 9 illustrates a structure of an MPU packet in which fragment data follows an MFU and MPU metadata is located at the end of an MPU according to an embodiment.

FIG. 9 illustrates a structure of an MPU packet 900 in which fragment data follows an MFU and MPU metadata is located at the end of an MPU according to an embodiment. According to an embodiment, the controller 202 of the multimedia transmission device 200 may specify a transmission order indicating that the fragment data is to be transmitted after the MFU and may assign the MPU metadata at the end of the MPU. Further, the controller 202 may specify a transmission order indicating that the MPU metadata is to be transmitted last among data included in the MPU. Referring to FIG. 9, during transmission of an MPU packet 900 of the multimedia transmission device 200, fragment data 920 may be transmitted after an access time 915 at a reception side. Thus, a wait time 960 taken to reproduce multimedia may be from the access time 915 to a time 935 when MPU metadata 940 included in the MPU packet 900 is received. Also, according to another embodiment, the wait time 960 taken to reproduce multimedia may be from the access time 915 to a time when a signaling message (not shown) received after the MPU metadata 940 included in the MPU packet 900 is received is received.

Figure 10:
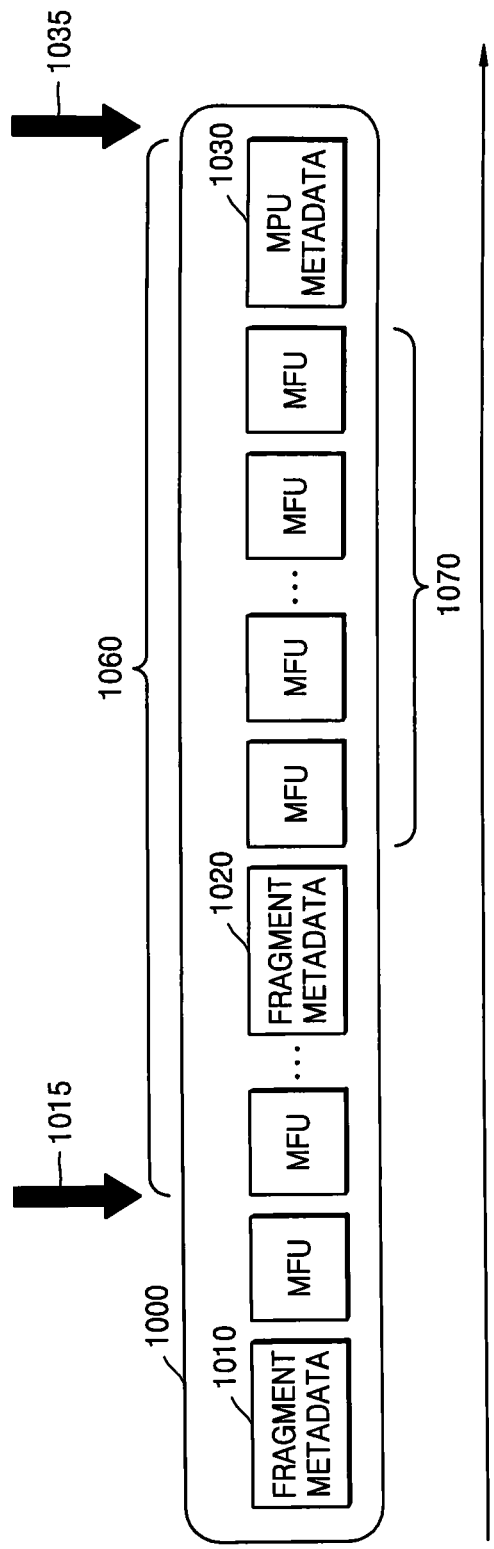
FIG. 10 illustrates a structure of an MPU packet in which fragment data is assigned before an MFU and MPU metadata is located at the end of an MPU according to an embodiment.

FIG. 10 illustrates a structure of an MPU packet 1000 in which fragment data is assigned before an MFU and MPU metadata is located at the end of an MPU according to an embodiment. According to an embodiment, the controller 202 of the multimedia transmission device 200 may determine a transmission order such that the fragment data is transmitted before the MFU is transmitted and may assign the MPU metadata at the end of an MPU packet and determine a transmission order such that the MPU metadata is lastly transmitted in the MPU.

According to the above-described embodiments, although a wait time for a reproduction operation after the multimedia transmission device 200 performs a random access operation may be reduced by adjusting an order in which MPU metadata and fragment metadata is to be transmitted, this is merely an example, and should not be construed as being limited thereto. According to an embodiment, each MFU may be data corresponding to multimedia and may include information about a video or audio sample frame. Among frames, an I frame may include more information than other types of frames and may be defined as a key MFU. According to an embodiment, the I frame may be independently decoded without auxiliary information, and the auxiliary information may be defined in a relationship with other frames. Information decoded by using only the I frame may be defined as static information. Unlike the I frame, a B frame and a P frame may include supplementary information such as movement information or dynamic information, and the supplementary information may be defined between different frames. According to an embodiment, unlike the I frame, the B frame and the P frame may not be independently decoded and may be decoded based on the supplementary information such as the movement information or the dynamic information. According to an embodiment, MFUs included in the same MPU may be positioned based on identifiers and may be set such that an MFU with an identifier of a great size is the key MFU. Media quality indicated in a request for multimedia may vary, and thus a case where a total amount of received static information is the maximum and a case where a total amount of received dynamic information is the maximum will be described below. However, these examples correspond to embodiments, and thus the present disclosure should not be construed as being limited thereto.

Figure 11:
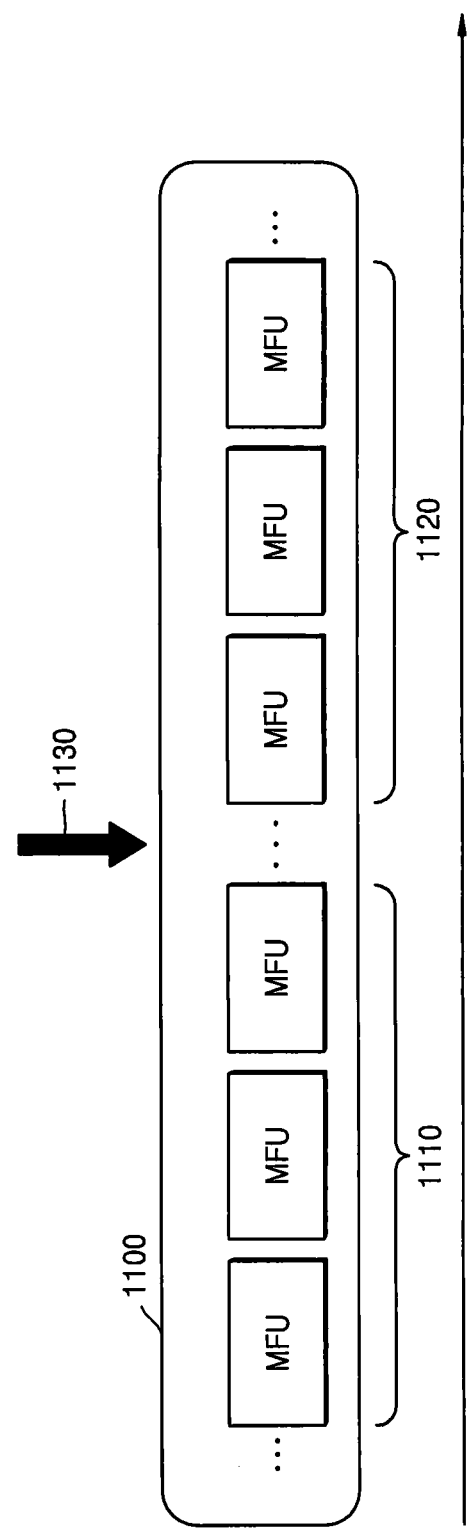
FIG. 11 illustrates a plurality of MFUs assigned in an MPU according to an embodiment.

FIG. 11 illustrates a plurality of MFUs assigned in an MPU 1100 according to an embodiment.

According to an embodiment, the controller 202 of the multimedia transmission device 200 may assign a transmission order to the MFUs in the MPU 1100. The controller 202 may assign MFU identifiers to the MFUs in accordance with the transmission order (e.g., an ascending transmission order). The controller 202 of the multimedia transmission device 200 may determine a transmission order of MPU packets to transmit MFUs in ascending order. In this case, more static information of multimedia may be transmitted than dynamic information. That is, with respect to an access time 1130, upon comparing an MFU 1110 transmitted before access and an MFU 1120 transmitted after access, the transmitted MFU 1120 may include many key MFUs having great identifier values. In this case, multimedia information received at a reception side may include more static information than dynamic information.

According to an embodiment, the controller 202 of the multimedia transmission device 200 may assign the MFUs included in the MPU 1100 to have MFU identifiers in descending order with respect to a transmission order direction. The controller 202 of the multimedia transmission device 200 may determine a transmission order of MPU packets to transmit MFUs in descending order. In this case, more dynamic information of multimedia may be transmitted than static information. That is, with respect to the access time 1130, upon comparing the MFU 1110 transmitted before access and the MFU 1120 transmitted after access, the transmitted MFU 1120 may include supplement information (for example, dynamic information) such as a B frame or a P frame and may include more MFUs having relatively smaller identifier values than the key MFU than the key MFU with respect to an I frame. Thus, in this case, multimedia information received by the multimedia reception device 220 may include more dynamic information than static information. Thus, the multimedia reception device 220 may reproduce multimedia corresponding to the MFU 1120 transmitted after the access time 1130 after receiving control information and MPU multimedia data (not shown) included in the MPU 1100. In this case, static information may be lost in reproduced information. For example, a user may be able to monitor only dynamic information and may be difficult to monitor static information when performing monitoring.

According to an embodiment, placing of MFUs in ascending order or in descending order may mean placing of MFUs in an MPU in ascending or descending order of MFU identifier values during a transmission process with respect to MFU identifier values. According to an embodiment, the multimedia reception device 220 may perform a reproduction operation after receiving the control information and MPU metadata (not shown) included in the MPU 1110 but dynamic information may be lost.

In operation S311, the controller 202 of the multimedia transmission device 200 may generate the first MPU and the second MPU based on a assignment result of operation S310 according to an embodiment.

In operation S312, the controller 202 of the multimedia transmission device 200 may generate interval information including information about time intervals by which the first MPU and the second MPU are to be transmitted according to an embodiment.

Figure 4:
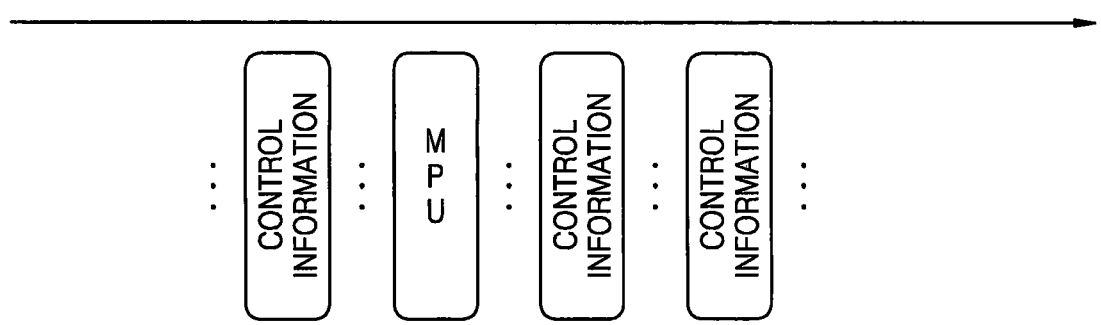
FIG. 4 illustrates elements included in an MMT packet.

FIG. 4 illustrates elements included in an MMT packet configured as an MPU and control information that may be transmitted by the multimedia transmission device 200.

Referring to FIG. 4, the controller 202 according to an embodiment may control the communicator 204 to transmit at least one piece of control information between transmission of two MPUs. According to an embodiment, the control information may include a signaling message. For example, when a transmission time interval determined in operation S310 is a and a length of the control information is b, control information by an integer less than a/b may be transmitted between the two MPUs.

According to an embodiment, when the length of the control information is less than a set threshold, the controller 202 may transmit the control information between transmissions of the two MPUs N times, wherein N may be an integer equal to or greater than 1. According to another embodiment, when the length of the control information is greater than the set threshold, the controller 202 may transmit index information between transmissions of the two MPUs M times, wherein M may be an integer equal to or greater than 1. For example, when a threshold is set as c and the length of the control information is less than c, a signaling message included in the control information may be transmitted between transmissions of the two MPUs N times, and when the length of the control information is greater than c, the signaling message included in the control information may be transmitted between transmissions of the two MPUs M times. According to an embodiment, N may be a value greater than M, the threshold may be preset and corrected by the multimedia transmission device 200. The threshold according to an embodiment may be set as at least one value. According to an embodiment, when the length of the signaling message is less than the preset threshold, the signaling message may be repeatedly transmitted as many as possible within an MPU transmission time interval. For example, the signaling message may be transmitted N times, wherein N may be an integer equal to or greater than 1. Thus, the number of times the multimedia transmission device 200 transmits the signaling message within a determined time interval may be adjusted, thereby increasing a probability of receiving the signaling message in an access performing device when a random access operation is performed on transmitted multimedia data. According to an embodiment, when the signaling message is relatively small, an increase in the probability of receiving the signaling message according to the above-described method may be very effective.

However, when the length of the signaling message is relatively long, since time taken to transmit the signaling message relatively increases, a perfect transmission of the signaling message within one MPU transmission time interval may be impossible. Thus, according to an embodiment, the multimedia transmission device 200 may transmit index information as the control information. In particular, when the length of the control information is greater than the set threshold, the index information may be transmitted between two MPUs M times. The index information may be provided to the multimedia reception device 220 in order to obtain a signaling message corresponding to the index information from among signaling messages included a server instead of directly transmitting the signaling message in the multimedia transmission device 200. M may be a value equal to or more than 1. In this case, the multimedia transmission device 200 may store the signaling message and correspondence relationship information (for example, a look-up table for matching the signaling message and the index information) indicating a relationship between the signaling message and the index information in a server (for example, a bandwidth VoD server).

According to an embodiment, the index information may be transmitted in an index packet form. According to such an embodiment, the multimedia transmission device 200 may use the index information having a relatively small size instead of the signaling message having a large size, and thus the multimedia reception device 220 may receive the signaling message from the server that stores the signaling message, other than the multimedia transmission device 200. Accordingly, the multimedia transmission device 200 may efficiently transmit control information.

According to an embodiment, the controller 202 may store the signaling message in the server and may store the correspondence relationship information between the stored signaling message and the index information in the server. According to another embodiment, the correspondence relationship information may be previously stored in the multimedia relationship information.

For example, a time interval may be the same as a reproduction time of a single MPU. To reduce a wait time necessary for reproduction of multimedia, an MPU capacity should be as small as possible. However, when the MPU capacity is very small, utilization of a bandwidth may deteriorate. According to an embodiment, the multimedia transmission device 200 may transmit MPU packets every 500 milliseconds (ms) in consideration of the utilization of the bandwidth but the time interval between MPUs of the present disclosure should not be construed as being limited thereto.

According to an embodiment, the control information may include data for operating and controlling a system that manages multimedia. That is, the control information may include component information (CI), and an MPU may include multimedia. The CI may include layouts of multimedia and may include information about reproduction time and location of transmitted multimedia, and thus multimedia may be displayed within a kind of layout through the information.

According to an MMT technology, a data fragment may be independently reproduced without separate processing information. Based on this, according to an embodiment, wait time of resources that may be reproduced may be reduced by adjusting a transmission order of MMT packets. In particular, in an embodiment, MPUs may be transmitted at a time interval, and the control information may be transmitted between two MPUs. When each MPU is transmitted, an MFU of each MPU may be firstly transmitted, and then MPU metadata and MPU fragment metadata may be transmitted. In this regard, an MPU may be a container format including at least one MFU and transmission and processing related information.

In operation S314, the controller 202 of the multimedia transmission device 200 may determine a packet transmission order in an MPU.

In operation S316, the multimedia transmission device 200 may transmit packets through the transmitter 204 according to the transmission order determined by the controller 202. According to an embodiment, MMT packets including MPUs assigned according to the transmission order determined by the multimedia transmission device 200 may be transmitted to the multimedia reception device 220 through a transmission protocol. After the transmission order of the MMT packets is determined, content of the MMT packets may be transmitted through the transmission protocol. The transmission protocol may include a Transmission Control Protocol/Internet Protocol (TCP/IP), a User Datagram Protocol (UDP), or a Hypertext Transfer Protocol (HTTP) but is not limited thereto.

According to an embodiment, data types may be transmitted after being split into TCP packets or UDP packets. According to an embodiment, the multimedia transmission device 200 may normally reproduce multimedia corresponding to an MFU received only after MPU metadata and fragment metadata are generally received. An MMT payload may be configured based on an MPU or an MFU and may be transmitted by being included in an MMT packet.

Figure 3B:
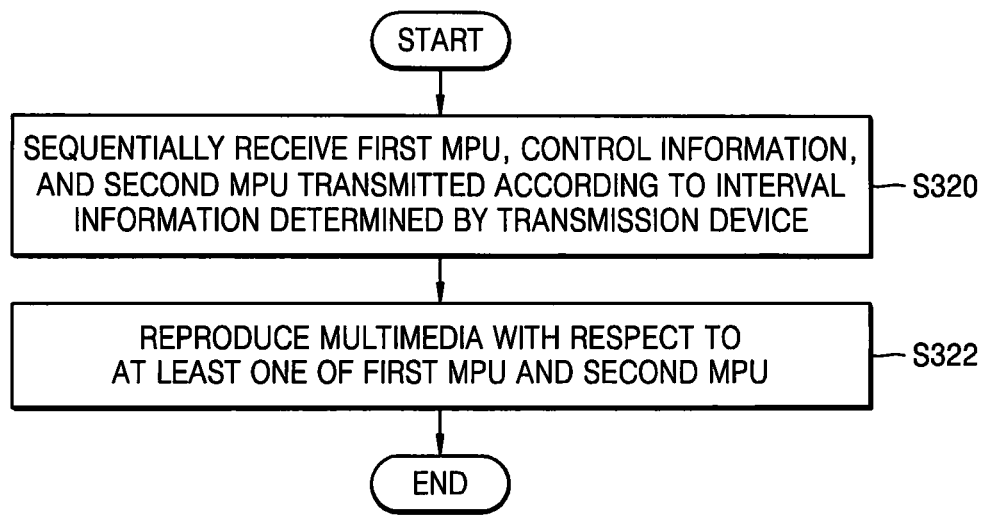
FIG. 3B is a flowchart of a method of receiving multimedia according to an embodiment.

FIG. 3B is a flowchart of a method of receiving multimedia according to an embodiment. The method of receiving multimedia may be performed by the multimedia reception device 220.

In operation S320, the multimedia reception device 220 may sequentially receive a first MPU, control information, and a second MPU that are transmitted according to interval information determined by a transmission device.

When the multimedia reception device 220 that receives multimedia performs a random access operation, the multimedia reception device 220 may be synchronized with the other multimedia receiving device 220 based on MPUs received at a certain time interval and a control signal.

According to an embodiment, a time interval may be the same as a reproduction time of a single MPU. To reduce the amount of time between the time when the multimedia reception device 220 accesses multimedia and the time when the multimedia reception device 220 reproduces the multimedia, an MPU capacity should be as small as possible. However, when the MPU capacity is very small, utilization of a bandwidth may deteriorate. According to an embodiment, the multimedia reception device 220 may transmit MPU packets every 500 milliseconds (ms) in consideration of synchronization with the other multimedia reception device 220 and the utilization of the bandwidth but the time interval between MPUs of the present disclosure should not be construed as being limited thereto.

According to an embodiment, the multimedia reception device 220 may receive control information through the communicator 224. According to an embodiment, the control information may include data for operating and controlling a system that manages multimedia and may mean a signaling message transmitted from the deliver function layer 130. A CI may include layouts of multimedia and may include information about reproduction time and location of transmitted multimedia, and thus multimedia may be displayed within a kind of layout through the information. Thus, the multimedia reception device 220 may perform a normal reproduction only after receiving the signaling message and multimedia. Since the access of the multimedia reception device 220 is random, the control information should be transmitted within a specific period. If the multimedia reception device 220 accesses a channel and receives MPUs including data about multimedia without receiving the control information, since the received MPUs are not reproduced, the multimedia reception device 220 may should perform a process on the MPUs that may not be reproduced.

In operation S322, when the multimedia reception device 220 receives all the MPUs and the control information, the controller 222 may reproduce multimedia based on at least one MFU included in at least one of the received first MPU and second MPU.

FIG. 4 illustrates elements included in an MMT packet configured as an MPU and control information that may be transmitted or received.

Referring to FIG. 4, the multimedia reception device 220 according to an embodiment may receive at least one piece of control information between receipt of two MPUs through the communicator 224. According to an embodiment, the control information may include a signaling message. The multimedia reception device 220 that accesses a channel, receives the control information between the receipt of the two MPUs, and receives an MPU including information about multimedia may promptly reproduce multimedia regarding the accessed channel. For example, when the multimedia transmission device 200 determines a transmission time interval as a and transmits control information having a length of b between MPUs, the multimedia reception device 220 may receive control information by an integer less than a/b between the received receipt of the two MPUs.

According to an embodiment, when the length of the control information is less than a set threshold, the communicator 224 may receive the control information between the two MPUs N times, wherein N may be an integer equal to or greater than 1. According to another embodiment, when the length of the control information is greater than the set threshold, the communicator 224 may receive index information between the two MPUs M times, wherein M may be an integer equal to or greater than 1. For example, when a threshold is set as c and the length of the control information is less than c, a signaling message included in the control information may be received between the two MPUs N times, and when the length of the control information is greater than c, the signaling message may be received between the two MPUs M times. According to an embodiment, N may be a value greater than M, the threshold may be preset and corrected by the multimedia transmission device 200. The threshold according to an embodiment may be set as at least one value.

According to an embodiment, when the length of the signaling message is less than a preset threshold, the signaling message may be repeatedly received as many as possible within an MPU transmission time interval. For example, the signaling message may be received N times, wherein N may be an integer equal to or greater than 1. Thus, even though the multimedia reception device 220 performs a random access operation to receive multimedia, since a probability of receiving the signaling message may be increased, multimedia may be promptly reproduced by the multimedia reception device 220. According to an embodiment, when the signaling message is relatively small, an increase in the probability of receiving the signaling message according to the above-described method may be very effective.

However, when the length of the signaling message is relatively long, since time taken to transmit the signaling message relatively increases, a perfect transmission of the signaling message within one MPU transmission time interval may be impossible. Thus, according to an embodiment, the multimedia transmission device 200 may transmit index information as the control information. In particular, when the length of the control information is greater than the set threshold, the index information may be transmitted between two MPUs M times. The index information may be used to obtain the signaling message corresponding to the index information from among signaling messages included in the multimedia reception device 220. M may be a value equal to or more than 1. In this case, the multimedia transmission device 200 may store the signaling message and correspondence relationship information (for example, a look-up table for matching the signaling message and the index information) that is information about a relationship between the signaling message and the index information in a server (for example, a bandwidth VoD server). When the multimedia reception device 220 performs the random access operation, the index information transmitted between MPUs M times may be received at a high probability. When the multimedia reception device 220 receives the index information, the multimedia reception device 220 may download a signaling message corresponding to multimedia from the server in order to reproduce multimedia as promptly as possible.

According to an embodiment, the index information may be transmitted in an index packet form. According to such an embodiment, even though a size of the signaling message is large, a transmission interval of MPUs may not be influenced, and when a plurality of multimedia reception devices 220 performs a random access operation (e.g., randomly access a channel), multimedia associated with the channel may be promptly reproduced, and accordingly, the multimedia reception devices 220 may be synchronized.

According to an embodiment, the controller 202 may store the signaling message in the server and may store the correspondence relationship information between the stored signaling message and the index information in the server. According to another embodiment, the correspondence relationship information may be previously stored in the multimedia relationship information.

According to an embodiment, since multimedia may be reproduced after receiving a signaling message, a wait time taken to reproduce the multimedia may be greatly different according to a time when the multimedia reception device 220 performs an access operation during a process of transmitting MPU packets.

Referring to FIG. 6, when the multimedia reception devices 220 according to an embodiment performs an access operation within transmission time intervals between two MPUs, the multimedia reception device 220 may reproduce multimedia content received after access provided that a signaling message is received. When access is performed between the two MPUs, the MPU A 610 that is an MPU previously transmitted before an access time may be not reproduced by the multimedia reception devices 220. After the access time 630, since the multimedia reception devices 220 receives the MPU metadata 622 and the fragment metadata 624 corresponding to the MPU B 620, after the time 640 when the MPU B 620 is completely received, multimedia corresponding to the MPU B 620 may be reproduced. That is, in this case, a wait time necessary for the multimedia reception devices 220 to perform a reproduction operation may be a time from the access time 630 to the time 640 when the MPU B 620 that is an MPU received immediately thereafter is completely received. After the wait time elapses, the multimedia reception devices 220 may reproduce multimedia corresponding to the MPU B 620. According to another embodiment, the wait time for reproducing the MPU B 620 may be a time from the access time 630 to a time when a signaling message (not shown) transmitted after the MPU B 620 is transmitted is received. The signaling message (not shown) may be a signaling message transmitted according to interval information including information about a difference in times when a plurality of MPUs determined by the multimedia transmission device 200 are to be transmitted. According to an embodiment, the multimedia corresponding to the MPU B 620 may be multimedia content corresponding to the MFU 626 that is at least one MFU included in the MPU B 620.

Referring to FIG. 7, since the multimedia reception devices 220 does not receive the MPU metadata 712 corresponding to the MPU A 710 and the fragment metadata 714 with respect to the access time 730, even after the MPU A 710 is received, the multimedia reception devices 220 may not reproduce multimedia corresponding to the MPU A 710. Since the multimedia reception devices 220 receives the MPU metadata 722 corresponding to the MPU B 720 and the fragment metadata 724 after the access time 730, after the time 740 when the MPU B 720 is completely received, the multimedia reception devices 220 may reproduce multimedia corresponding to the MPU B 720. That is, in this case, a wait time necessary for the multimedia reception devices 220 to perform a reproduction operation may be a time from an access time 730 to the time 740 when the MPU B 720 that is an MPU received immediately thereafter is completely received. Also, according to another embodiment, the wait time for reproducing the MPU B 720 may be a time from the access time 730 to a time when a signaling message (not shown) transmitted after the MPU B 720 is transmitted is received. The signaling message (not shown) may be a signaling message transmitted according to interval information including information about a difference in times when a plurality of MPUs generated by the multimedia transmission device 200 are to be transmitted.

Referring to FIG. 8, the MPU metadata 812 and the fragment metadata 814 may be transmitted as data corresponding to last two pieces of data among data included in the MPU A 810. Thus, when the multimedia reception devices 220 performs an access operation during transmission of the MPU A 810, since the MPU metadata 812 and the fragment metadata 814 are received, the multimedia reception devices 220 may promptly perform a multimedia reproduction operation. In this case, a wait time may be a time from a time 830 when access is performed to a time when the MPU metadata 812 and the fragment metadata 814 of the MPU A 810 are received. Also, according to another embodiment, a wait time may be a time from the time 830 when access is performed to a time when a signaling message (not shown) received after the MPU metadata 812 and the fragment metadata 814 of the MPU A 810 are received is received. The signaling message (not shown) may be a signaling message transmitted according to interval information including information about a difference in times when a plurality of MPUs generated by the multimedia transmission device 200 are to be transmitted.

That is, when the multimedia reception device 220 receives the MPU metadata 812 and the fragment metadata 814, the multimedia reception device 220 may reproduce multimedia corresponding to the at least one MPU 818 received after the access time 830 as related to the MPU A 810 including the MPU metadata 812 and the fragment metadata 814.

According to an embodiment, when the multimedia reception device 220 performs a random access operation during an MPU transmission process, information about multimedia included in an MPU may be reproduced when fragment metadata and MPU metadata of the MPU, and control information (for example, a signaling message) are received. When the multimedia reception device 220 performs a random access operation during an MPU reception process, receives fragment metadata and MPU metadata of the MPU, and does not receive control information, the received fragment metadata and MPU metadata of the MPU may be thrown.

Referring to FIG. 9, according to an embodiment, during transmission of the MPU packet 900, the fragment data 920 may be received after the access time 915 that is a time when the multimedia reception device 220 performs a random access operation. Thus, the wait time 960 taken to reproduce multimedia may be from the access time 915 to the time 935 when MPU metadata 940 included in the MPU packet 900 is received. Also, according to another embodiment, the wait time 960 taken to reproduce multimedia may be from the access time 915 to a time when a signaling message (not shown) received after the MPU metadata 940 included in the MPU packet 900 is received is received. The signaling message (not shown) may be a signaling message transmitted according to interval information including information about a difference in transmission times of a plurality of MPUs generated by the multimedia transmission device 200.

Referring to FIG. 10, according to an embodiment, during transmission of the MPU packet 1000, the fragment data 1020 may be received after the access time 1015 that is a time when the multimedia reception device 220 performs a random access operation. Thus, the wait time 1060 taken to reproduce multimedia may be from the access time 1015 to the time 1035 when MPU metadata 1030 included in the MPU packet 1000 is received. Also, according to another embodiment, a wait time (not shown) taken to reproduce multimedia may be from the access time 1015 to a time when a signaling message (not shown) received after the MPU metadata 1030 included in the MPU packet 1000 is received is received. The signaling message (not shown) may be a signaling message transmitted according to interval information including information about a difference in transmission times of a plurality of MPUs generated by the multimedia transmission device 200.

FIG. 11 illustrates a plurality of MFUs assigned in an MPU 1100 according to an embodiment.

According to an embodiment, the controller 202 of the multimedia transmission device 200 may assign the MFUs included in the MPU 1100 to have MFU identifiers in ascending order with respect to a transmission order direction. The controller 202 of the multimedia transmission device 200 may determine a transmission order of MPU packets to transmit MFUs in ascending order. In this case, more static information of multimedia may be transmitted than dynamic information. That is, with respect to the access time 1130 when the multimedia reception device 220 performs an access operation, upon comparing the MFU 1110 transmitted before access and the MFU 1120 received by the multimedia reception device 220 after access, the MFU 1120 received by the multimedia reception device 220 may include many key MFUs having great identifier values. In this case, multimedia information received by the multimedia reception device 220 may include more static information than dynamic information.

According to an embodiment, the controller 202 of the multimedia transmission device 200 may assign the MFUs included in the MPU 1100 to have MFU identifiers in descending order with respect to a transmission order direction. The controller 202 of the multimedia transmission device 200 may determine a transmission order of MPU packets to transmit MFUs in descending order. In this case, more dynamic information of multimedia may be transmitted than static information. That is, with respect to the access time 1130 when the multimedia reception device 220 performs an access operation, upon comparing the MFU 1110 transmitted before access and the MFU 1120 received by the multimedia reception device 220 after access, the MFU 1120 received by the multimedia reception device 220 may include supplement information (for example, dynamic information) such as a B frame or a P frame and may include more MFUs having relatively smaller identifier values than the key MFU than the key MFU with respect to an I frame. Thus, in this case, multimedia information received by the multimedia reception device 220 may include more dynamic information than static information. Thus, the multimedia reception device 220 may reproduce multimedia corresponding to the MFU 1120 transmitted after the access time 1130 after receiving control information and MPU multimedia data (not shown) included in the MPU 1100. In this case, static information may be lost in reproduced information. For example, a user may be able to monitor only dynamic information and may be difficult to monitor static information when performing monitoring.

According to an embodiment, placing of MFUs in ascending order or in descending order may mean placing of MFUs in an MPU in ascending or descending order of MFU identifier values during a transmission process with respect to MFU identifier values.

According to an embodiment, the multimedia reception device 220 may receive MMT packets including MPUs transmitted according to the transmission order determined by the multimedia transmission device 200 through a transmission protocol. After the transmission order of the MMT packets is determined, content of the MMT packets may be transmitted through the transmission protocol. The transmission protocol may include a Transmission Control Protocol/Internet Protocol (TCP/IP), a User Datagram Protocol (UDP), or a Hypertext Transfer Protocol (HTTP) but is not limited thereto.

According to an embodiment, data types may be transmitted after being split into TCP packets or UDP packets. According to an embodiment, the multimedia transmission device 200 may normally reproduce multimedia corresponding to an MFU received only after MPU metadata and fragment metadata are generally received. An MMT payload may be configured based on an MPU or an MFU and may be transmitted by being included in an MMT packet.

The invention claimed is:

1. A method of transmitting multimedia, comprising:
    assigning media processing unit (MPU) metadata included in a first MPU and a second MPU such that the MPU metadata is transmitted as last of the first MPU and the second MPU;
    generating the first MPU and the second MPU based on the assignment;
    generating interval information indicating a transmission time interval for transmitting the first MPU and the second MPU;
    transmitting the first MPU;
    transmitting control information within the transmission time interval indicated by the interval information; and
    transmitting the second MPU based on the interval information, after transmitting the control information,
    wherein transmitting of control information comprises:
    comparing a length of a signaling message and a preset threshold; and
    transmitting the signaling message or index information corresponding to the signaling message between receipt of the first MPU and the second MPU as the control information, according to whether the length of the signaling message is greater than the preset threshold.

2. The method according to claim 1, wherein the transmitting of the control information comprises:
    when the length of the signaling message is less than the threshold, transmitting the signaling message N times between the receipt of the first MPU and the second MPU; and
    when the length of the signaling message is greater than or equal to the threshold, transmitting index information M times between the receipt of the first MPU and the second MPU, the transmitting index information corresponding to the signaling messaged,
    wherein N is a value greater than M.

3. The method according to claim 2, wherein the transmitting of the index information comprises:
    storing the signaling message in a server; and
    storing correspondence relationship information in the server, the correspondence relationship information indicating a relationship between the signaling message and the index information.

4. The method according to claim 1, wherein the assigning comprises:
    assigning a transmission order to at least one media fragment unit (MFU) included in at least one of the first MPU and the second MPU and to fragment metadata relating to the at least one MFU; and
    transmitting the at least one MFU and the fragment metadata according to the transmission order such that the fragment metadata is transmitted after the at least one MFU is transmitted.

5. The method according to claim 1, wherein the assigning comprises:
    assigning a transmission order to at least one MFU included in at least one of the first MPU and the second MPU and to fragment metadata relating to the at least one MFU; and
    transmitting the at least one MFU and the fragment metadata according to the transmission order such that the fragment metadata is transmitted before the at least one MFU is transmitted.

6. A device for transmitting multimedia, comprising:
    a transmitter configured to transmit at least one of a first MPU, a second MPU, and control information; and
    a controller configured to control the transmitter to assign MPU metadata included in the first MPU and the second MPU such that the MPU metadata is transmitted as last of the first MPU and the second MPU, generate the first MPU and the second MPU based on the assignment, generate interval information indicating a transmission time interval for transmitting the first MPU and the second MPU, transmit the first MPU, transmit control information within the transmission time interval indicated by the interval information after transmitting the first MPU, transmit the second MPU based on the interval information after transmitting the control information, compare a length of a signaling message and a preset threshold, and transmit the signaling message or index information corresponding to the signaling message between receipt of the first MPU and the second MPU as the control information, according to whether the length of the signaling message is greater than the preset threshold.

7. The device according to claim 6, wherein the controller, when the length of the signaling message is less than the threshold, transmits the signaling message between the receipt of the first MPU and the second MPU N times; and, when the length of the signaling message is greater than or equal to the threshold, transmits index information corresponding to the signaling message between the receipt of the first MPU and the second MPU M times, wherein N is a value greater than M.

8. The device according to claim 7, wherein, when the length of the signaling message is greater than or equal to the threshold, the controller stores the signaling message in a server and stores relationship information indicating a relationship between the signaling message and the index information in the server.

9. The device according to claim 6, wherein the controller assigns fragment metadata relating to at least one media fragment unit (MFU) included in at least one of the first MPU and the second MPU such that the fragment metadata is transmitted after the at least one MFU is transmitted.

10. The device according to claim 6, wherein the controller assigns fragment metadata relating to at least one MFU included in at least one of the first MPU and the second MPU such that the fragment metadata is transmitted before the at least one MFU is transmitted.

11. A method of receiving multimedia comprising:
sequentially receiving a first MPU, control information, and a second MPU that are transmitted according to interval information determined by a transmission device; and
reproducing multimedia corresponding to at least one of the first MPU and the second MPU,
wherein MPU metadata included in at least one of the first MPU and the second MPU is assigned such that the MPU metadata is transmitted as the at least one of the first MPU and the second MPU,
wherein the control information includes a length of a signaling message, and receiving the control information comprises receiving a signaling message or index information corresponding to the signaling message between the receiving of the first MPU and the second MPU, according to whether the length of the signaling message is greater than the preset threshold, and
wherein the index information is used to obtain the signaling message.

12. The method according to claim 11, wherein
the receiving of the control information comprises:
receiving a signaling message N times between the receiving of the first MPU and the second MPU when the length of the signaling message is less than a threshold; and
receiving index information M times between the receiving of the first MPU and the second MPU when the length of the signaling message is greater than or equal to the threshold, the index information corresponding to the signaling message,
wherein N is a value greater than M.

13. The method according to claim 12, wherein the receiving of the index information comprises: receiving the signaling message corresponding to the index information from a server that stores the signaling message.

14. The method according to claim 13, wherein the receiving of the signaling message corresponding to the index information comprises: receiving the signaling message corresponding to the index information from the server based on correspondence relationship information indicating a relationship between the signaling message and the index information.

15. The method according to claim 11, wherein the receiving comprises:
receiving at least one MFU included in at least one of the first MPU and the second MPU; and
receiving fragment metadata relating to the at least one MFU after receiving the at least one MFU.

16. The method according to claim 11, wherein the receiving comprises:
receiving fragment metadata relating to the at least one MFU included in at least one of the first MPU and the second MPU; and
receiving the at least one MFU after receiving the fragment metadata.

* * * * *